United States Patent
Verdigets et al.

(10) Patent No.: US 6,814,223 B1
(45) Date of Patent: Nov. 9, 2004

(54) SELF-CLOSING HINGE ROD RETENTION IN MODULAR PLASTIC CONVEYOR BELTS

(75) Inventors: Christopher J. Verdigets, Ponchatoula, LA (US); David C. Weiser, River Ridge, LA (US); Ryan Lemaire, Lafayette, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/605,367

(22) Filed: Sep. 25, 2003

(51) Int. Cl.[7] .............................................. B65G 15/30
(52) U.S. Cl. ..................... 198/844.1; 198/850; 198/853
(58) Field of Search ..................... 198/844.1, 850–853

(56) References Cited

U.S. PATENT DOCUMENTS

| | | | |
|---|---|---|---|
| 4,709,807 A | 12/1987 | Poerink | 198/853 |
| 4,832,187 A | 5/1989 | Lapeyre | 198/851 |
| 4,893,710 A | 1/1990 | Bailey et al. | 198/853 |
| 4,953,693 A | 9/1990 | Draebel | 198/853 |
| 5,000,312 A | 3/1991 | Damkjaer | 198/853 |
| 5,020,659 A | 6/1991 | Hodlewsky | 198/853 |
| 5,125,504 A | 6/1992 | Corlett et al. | 198/850 |
| 5,217,110 A | 6/1993 | Spangler et al. | 198/852 |
| 5,247,789 A | 9/1993 | Abbestam et al. | 59/78 |
| 5,293,989 A | 3/1994 | Garbagnati | 198/853 |
| 5,303,818 A | 4/1994 | Gruettner et al. | 198/850 |
| 5,305,869 A | 4/1994 | Damkjaer | 198/689.1 |
| 5,335,768 A | 8/1994 | Schladweiler | 198/853 |
| 5,339,946 A | 8/1994 | Faulkner et al. | 198/494 |
| 5,379,883 A | 1/1995 | Damkjaer | 198/853 |
| 5,435,435 A | 7/1995 | Chiba et al. | 198/853 |
| 5,439,099 A | 8/1995 | Bos et al. | 198/853 |
| 5,482,156 A | 1/1996 | Damkjaer | 198/853 |
| 5,586,644 A | 12/1996 | Coen et al. | 198/853 |
| 5,634,550 A | 6/1997 | Ensch et al. | 198/457 |
| 5,662,211 A | 9/1997 | Quentin | 198/853 |
| 5,678,683 A | 10/1997 | Stebnicki et al. | 198/853 |
| 5,738,205 A | 4/1998 | Draebel | 198/852 |
| 5,899,322 A | 5/1999 | Gamble, Jr. | 198/853 |
| 5,904,241 A | 5/1999 | Verdigets et al. | 198/853 |
| 5,957,268 A | 9/1999 | Meulenkamp | 198/850 |
| 5,996,776 A | 12/1999 | van Zijderveld | 198/853 |
| 6,196,379 B1 | 3/2001 | Van Esch et al. | 198/853 |
| 6,196,381 B1 | 3/2001 | Kato et al. | 198/853 |
| 6,213,292 B1 | 4/2001 | Takahashi et al. | 198/853 |
| 6,216,854 B1 | 4/2001 | Damkjaer et al. | 198/853 |
| 6,308,825 B1 | 10/2001 | Nakamura | 198/853 |
| 6,499,587 B1 * | 12/2002 | Greve | 198/853 |
| 6,581,758 B1 | 6/2003 | van Zijderveld et al. | 198/853 |

* cited by examiner

Primary Examiner—Richard Ridley
(74) Attorney, Agent, or Firm—James T. Cronvich

(57) ABSTRACT

An edge module for a modular plastic conveyor belt providing a self-closing retention system for retaining headless hinge rods in modular plastic conveyor belts. The edge module has a chamber in an outer edge portion of the module that slidably receives a rod retention member, such as a plug. The plug slides along the chamber from a closed position occluding a hinge rod passageway through interleaved hinges of consecutive rows of belt modules to an open, unoccluding position. A spring in the chamber urges the plug back toward the closed position. The plug is moved to the open position in two ways: by the force of a hinge rod against an oblique face during insertion of the rod into a belt; or manually by a tool engaging an easily accessible indentation in the plug.

34 Claims, 4 Drawing Sheets

SELF-CLOSING HINGE ROD RETENTION IN MODULAR PLASTIC CONVEYOR BELTS

BACKGROUND OF INVENTION

The invention relates generally to power-driven conveyors and, more particularly, to hinge rod retention structure in plastic conveyor belts constructed of rows of modules pivotally interconnected by hinge rods.

Conventional modular plastic conveyor belts and chains are constructed of modular plastic links, or belt modules, arranged end to end and side to side in rows. Spaced-apart hinge eyes extending from each end of the modules include aligned rod holes. The hinge eyes along the leading end of a row of modules are interleaved with the hinge eyes along the trailing end of an adjacent row. Hinge rods, journalled in the aligned rod holes of interleaved hinge eyes, connect adjacent rows together end to end to form a conveyor belt of selected length and width capable of articulating about a drive sprocket or drum at the hinges formed between adjacent belt rows.

But belt motion and belt tension can cause the hinge rods to migrate along the hinge or to lengthen. If a rod is allowed to extend out of the hinge beyond the side of the belt, the rod can catch on conveyor structure or other objects and cause damage. Consequently, it is important that hinge rods be contained within the belt. Many conventional modular plastic conveyor belts use a sliding retention member that can be manually moved from a closed position occluding the rod holes to an open position in which the aligned rod holes are accessible for rod insertion or removal. To prevent the retention members from accidentally moving from the closed position to the open position while the belt is running, the retention member is designed to require a significant force to move it out of its closed position. Before a hinge rod can be inserted into the aligned rod holes, a retention member must be moved out of the way. Once the rod is fully inserted, the retention member may be returned to its original position. Sliding the retention member out of the way to allow access to the hinge, pushing the rod into the aligned rod holes, and sliding the retention member back into position occluding the rod holes and retaining the hinge rod is one of the most time-consuming and physically challenging steps in the assembly and repair of modular plastic conveyor belts. And, if the retention member is inadvertently left in its open position, the unconfined rod can work its way out the side of the belt while the belt is running.

Consequently, there is a need for a rod retention system for a modular plastic conveyor belt that is self-closing and does not require the time and physical effort of conventional systems.

SUMMARY OF INVENTION

This need and other needs are satisfied by a modular plastic conveyor belt edge module embodying features of the invention. The edge module comprises a module body, a retention member, and biasing means. The module body extends longitudinally from a first end to a second end, laterally from an inside edge to an outside edge, and in thickness from a top side to a bottom side. The module body includes a first set of hinge eyes spaced apart along the first end and a second set spaced apart along the second end. The hinge eyes form rod holes that are laterally aligned to define a first rod passageway at the first end and a second rod passageway at the second end. Outside edge structure in the module body defines a chamber near the outside edge of the module body. The chamber intersects the first rod passageway and extends in a slide direction to a far end. The retention member, which is received in the chamber, defines a slide axis and includes a guide surface and a rod-contacting face oblique to the slide axis. The retention member resides in the chamber with the slide axis of the retention member extending in the slide direction. The rod-contacting face obliquely faces the outside edge of the module body. The outside edge structure also includes a guide formed along the chamber that engages the guide surface of the retention member. The guide guides the retention member in the slide direction along the chamber. The retention member slides between a first position and a second position. In the first position, the retention member occludes at least part of the first rod passageway. In the second position, the first rod passageway is unoccluded. The biasing means, such as a spring, resides in the chamber and urges the retention member toward the first position. When the hinge rod is inserted laterally from the outside edge of a belt, the end of the rod slidingly bears against the rod-contacting face of the retention member, which forces the retention member to slide in the slide direction along the chamber against the biasing means to the second position until the retention member clears the first rod passageway. The end of the rod then slides off the rod-contacting face into the unoccluded first rod passageway.

In another aspect of the invention, an edge module for a modular plastic conveyor belt comprises a module body with outside edge structure forming a chamber that slidably receives a spring-loaded rod retention member. The module body extends longitudinally from a first end to a second end, laterally from an inside edge to an outside edge, and in thickness from a top side to bottom side. The module body includes first and second sets of hinge eyes spaced apart along the first and second ends of the module body. Rod holes formed in the hinge eyes and aligned laterally along the first and second ends form first and second rod passageways along the first and second ends. Outside edge structure in the module body forms a chamber near the outside edge of the module body. The chamber intersects the first rod passageway and extends to a closed far end. A spring extends between the far end of the chamber and the retention member to urge the retention member toward the first end of the module body into a position at least partly occluding the first rod passageway.

In yet another aspect of the invention, an edge module for a modular plastic conveyor belt comprises a module body that extends longitudinally from a first end to a second end, laterally from an inside edge to an outside edge, and in thickness from a top side to a bottom side. The module body includes first and second sets of hinge eyes spaced apart along the first and second ends of the module body. Rod holes formed in the hinge eyes are aligned laterally across the first and second ends of the module body. The aligned rod holes define first and second rod passageways along the first and second ends. Outside edge structure defines a chamber near the outside edge of the module body. The chamber intersects the first rod passageway and extends in a slide direction to a far end. A retention member slidably received in the chamber includes a rod-contacting face at the end of the retention member nearer the first end of the module body. The rod-contacting face is oblique to the first rod passageway and to the slide direction.

In still another aspect of the invention, an edge module for a modular plastic conveyor belt comprises a module body extending longitudinally from a first end to a second end, laterally from an inside edge to an outside edge, and in thickness from a top side to a bottom side. The module body includes a first set of hinge eyes spaced apart along the first end and a second set of hinge eyes spaced apart along the second end. The first set of hinge eyes forms rod holes aligned laterally to define a first rod passageway; the second set of hinge eyes forms rod holes aligned laterally to define a second rod passageway. Outside edge structure in the module body forms a chamber near the outside edge of the module body intersecting the first rod passageway and extending to a far end. A retention member received in the chamber slides between a closed position at least partly occluding the first rod passageway and an open position clear of the first rod passageway. Biasing means urges the retention member toward the closed position occluding the first rod passageway.

BRIEF DESCRIPTION OF DRAWINGS

These and other features, aspects, and advantages of the invention are better understood by reference to the following description, appended claims, and accompanying drawings in which:

DETAILED DESCRIPTION

Figure 1:
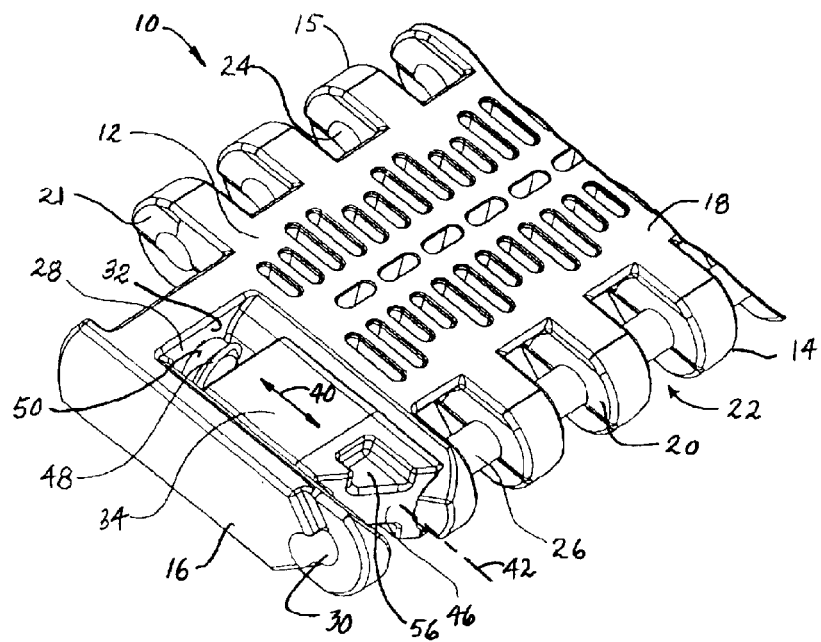
FIG. 1 is an isometric view of an outside edge portion of one version of an edge module embodying features of the invention for use in a modular plastic conveyor belt.

A portion of one version of an edge module for a modular plastic conveyor belt embodying features of the invention is shown in FIGS. 1-4. The module 10 includes a module body 12 that extends longitudinally from a first end 14 to a second end 15, laterally from an outside edge 16 to an opposite inside edge, and in thickness from a top side 18 to a bottom side 19. The module body includes a first set of hinge eyes 20 spaced apart laterally across gaps 22 along the first end and a second set of hinge eyes 21 spaced apart along the second end. Rod holes 24 formed in the hinge eyes along each end are aligned to form a lateral passageway for a headless hinge rod 26. A chamber 28 is formed in outside edge structure of the module near its outside edge. The chamber opens onto the top and bottom sides of the module body and intersects the first rod passageway 30 at the first end and terminates at a closed far end 32. The chamber is preferably oriented perpendicular to the first rod passageway, but could alternatively be oblique to the passageway.

A retention member 34, in the form of a plug, is sized to be received in the chamber. Preferably, although not necessarily, the plug does not extend beyond the top and bottom sides of the module body. In that way, the plug cannot accidentally catch on conveyed articles, conveyor carryway or returnway structures, or other objects. Side walls of the chamber form guides 36, in this example, convex surfaces, that cooperate with concave guide surfaces 38, 39 forming opposite side walls of the plug to allow the plug to slide along the chamber in a slide direction 40. The plug defines a slide axis 42 parallel to its guide surfaces and, when in place in the chamber, in the slide direction. Top and bottom sides 44, 45 of the plug are generally trapezoidal in shape and are bridged by a rod-contacting face 46 at the end of the plug nearer the first rod passageway. The rod-contacting face is angled obliquely relative to the slide axis of the plug and to the first rod passageway when installed in the chamber. This makes the outside guide surface 38 shorter than the inside guide surface 39. Although the rod-contacting face is a planar surface, it could define a curved contour such as a convex contour.

One end of a spring 48, in this example a metal coil spring, is retained on a stub 49 in a recess 51 formed in an end of the plug. The other end of the spring is retained on a stub 50 formed in the module body to keep the spring in position at the far end of the chamber. The spring exerts a force against the plug biasing it toward the first end of the module body. Biasing means other than the metal coil spring shown could alternatively be used; for example, a metal spring molded into the module body or the plug, or a plastic spring unitarily molded with the plug or with the module body, as described subsequently in connection with FIGS. 5 and 6.

Figure 2:
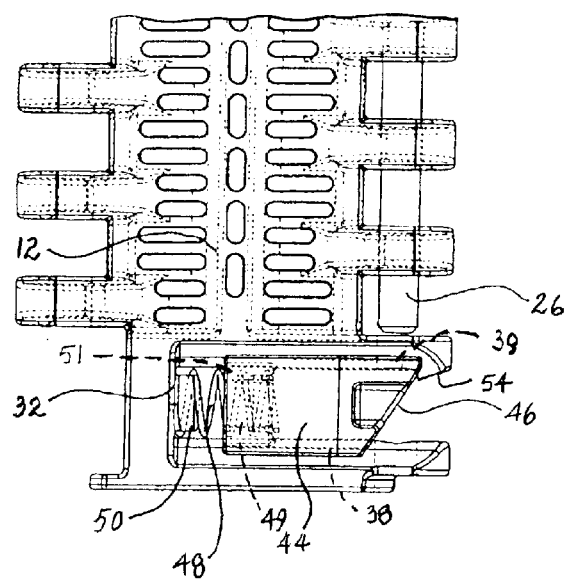
FIG. 2 is a top plan view of an outside edge portion of the edge module of FIG. 1.
Figure 3:
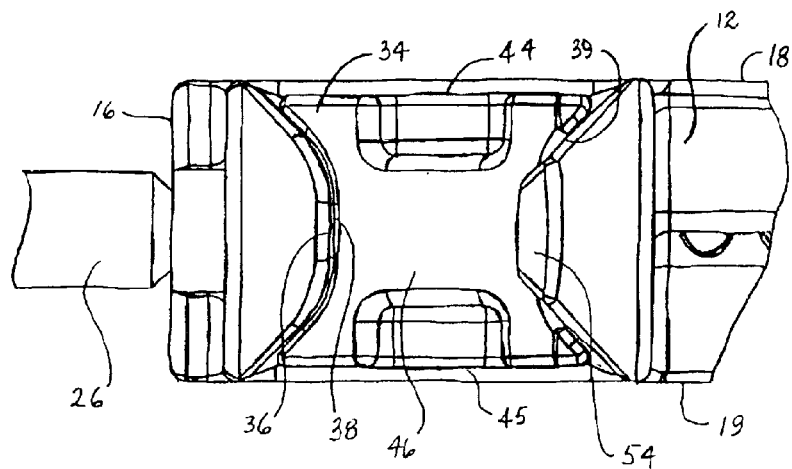
FIG. 3 is a magnified front elevation view of an outside edge portion of the edge module of FIG. 1.

As best shown in FIGS. 1 and 2, the plug 34 is used to retain a hinge rod 26 in the first passageway when a belt constructed with such an edge module is running. The plug prevents the confined rod from migrating out the side of the belt. The spring pressure maintains the plug in an occluding position in which the plug's inner side wall 39 blocks the first passageway. In this example, the plug covers the entire passageway, but the plug could alternatively cover just enough of the passageway to block the rod from exiting.

Figure 4A:
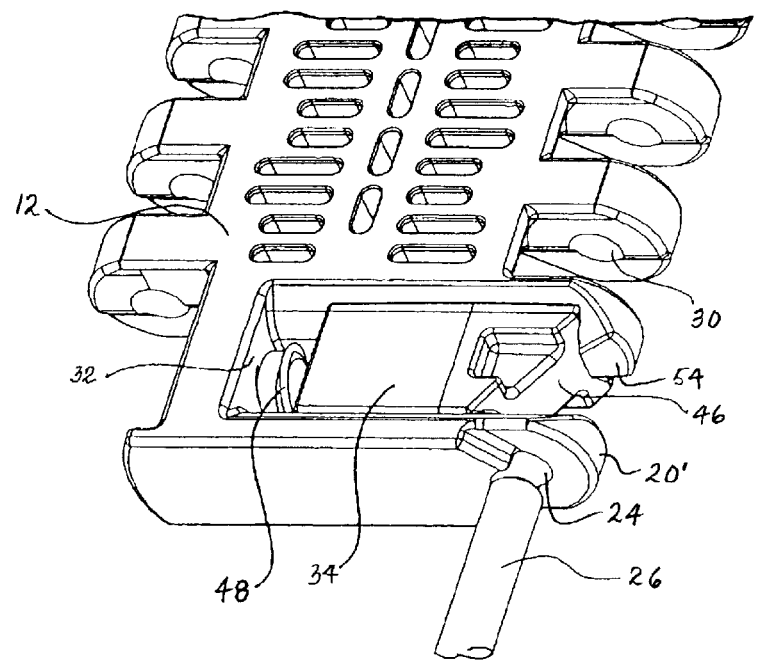
FIGS. 4A and 4B are isometric views of an outside edge portion of an edge module as in FIG. 1 with a rod retention member in a first occluding position and a second unoccluding position.
Figure 4B:
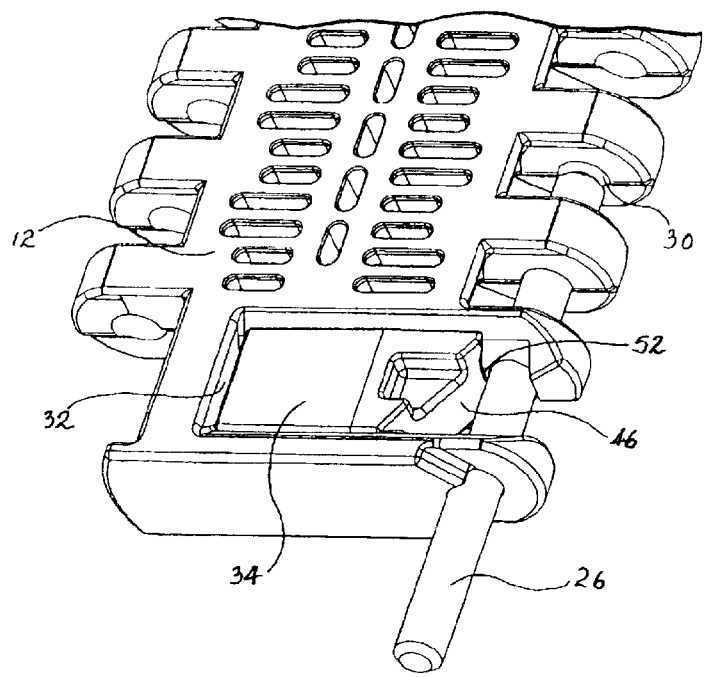

The insertion of a hinge rod into the first passageway is illustrated in FIGS. 4A and 4B. A rod 26 is inserted into the passageway through the rod hole 24 in the outermost hinge eye 20'. The end of the rod pushes against the oblique rod-contacting face 46 of the plug 34 in the closed, occluding position (FIG. 4A). The force of the rod against the angled face imparts a component of force in the sliding direction that compresses the spring 48 as the plug slides along the chamber toward the far end 32. The end of the rod slides along the oblique face until the plug clears the first rod passageway and assumes an unoccluding position. The rod is directed into the passageway along a curved contour 52 at the interface of the rod-contacting face and the inner side wall of the plug. Once the rod clears the plug upon its complete insertion into the first rod passageway, the spring urges the plug from its unoccluding position back to its occluding position retaining the rod in the passageway. Thus, the plug automatically returns to its occluding position once the rod is inserted.

The edge structure of the module also includes a stop 54 at the end of the inner guide that extends partway across the mouth of the chamber. The narrowed mouth prevents the plug and the spring from escaping the chamber and helps define the plug's occluding position.

The plug includes an indentation 56 in its top and bottom sides that allows the plug to be manually retracted from either the top or bottom side of the module. The indentation is preferably shaped to accept a commonly available tool, such as a screwdriver. The blade of a screwdriver is used to push the plug along the chamber clear of the first rod passageway so that the rod can be removed. Although the indentation serves as a convenient means for manually retracting the plug, other means make viable alternatives, such as raised ridges or other protrusions or recesses that can be engaged by a tool or with fingers.

Figure 5:
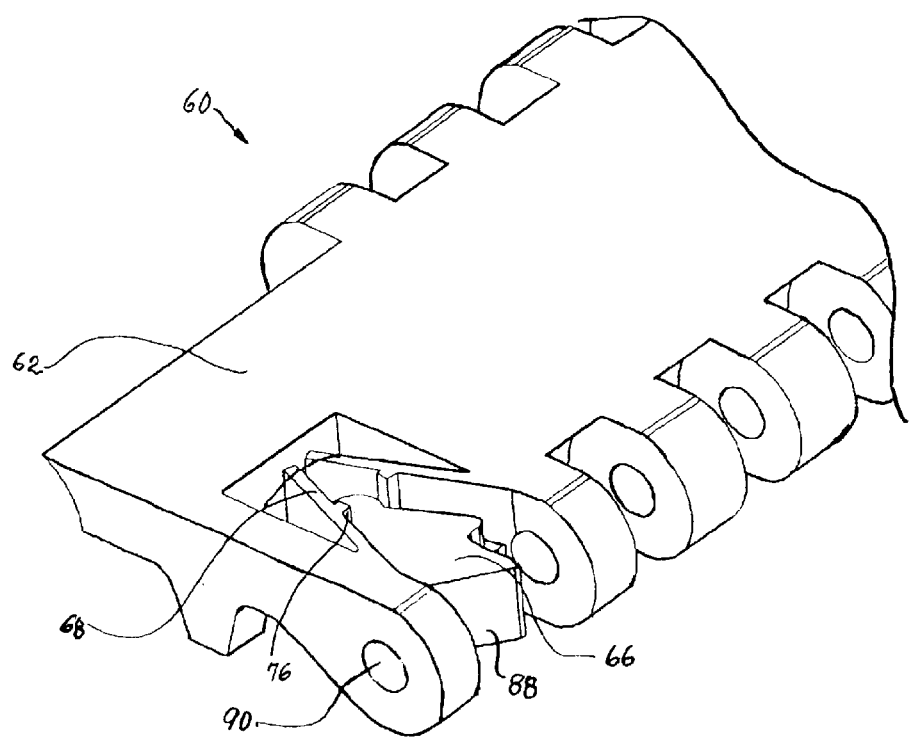
FIG. 5 is an isometric view of an edge portion of another version of edge module embodying features of the invention.
Figure 6:
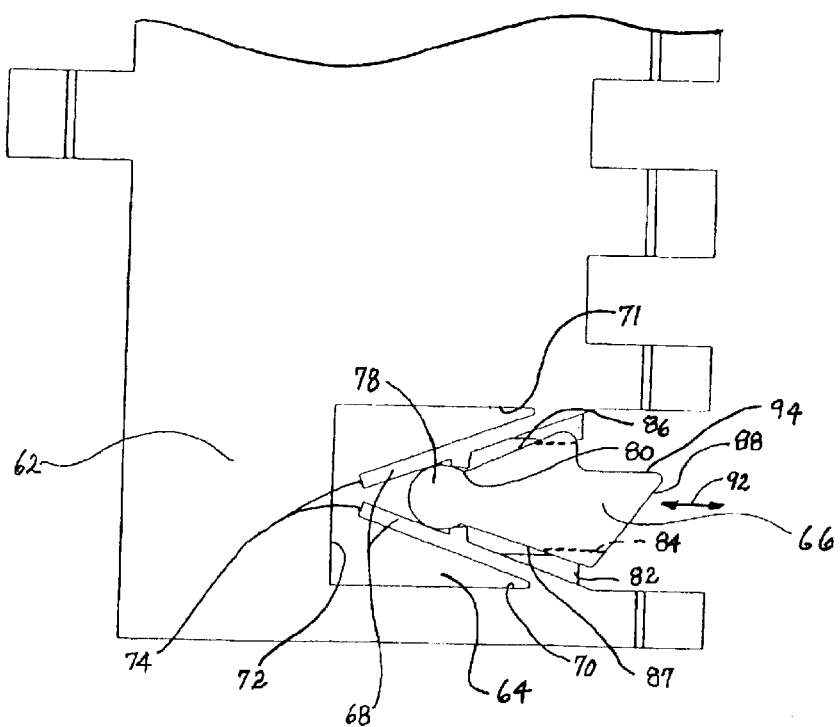
FIG. 6 is a top plan view of the outside edge portion of the edge module of FIG. 5.

Another version of an edge module embodying features of the invention is shown in FIGS. 5 and 6. The edge module 60 includes a module body 62 and other features of the edge module 10 of FIGS. 1-4. A chamber 64 is formed in the outer edge structure of the module body to slidably receive a plug 66. Flaps 68 each extend at one end from opposite side walls 70, 71 obliquely toward a far end 72 of the chamber. The flaps terminate at free ends 74. The flaps form a V-shaped structure open at the vertex. A rib 76 extends vertically along the facing sides of the flaps. (If the mouth of the chamber in this version were restricted by a stop as in FIG. 1, the vertical ribs on the flaps could be eliminated.) The opposed flaps form a spring structure molded unitarily with the edge module. The plug includes a head 78 at one end joining the body of the plug at a neck 80. The diameter of the head exceeds the spacing between the opposing ribs on the flaps. In this way, the flaps retain the head between the ribs and the open vertex formed by the flaps. Horizontal ridges 82 formed on the flaps act as guides for the plug. Horizontal grooves 84 in the angled sides 86, 87 of the plug act as guide surfaces by slidably receiving the ridges on the flaps. The plug includes a flat rod-contacting face 88 obliquely arranged relative to the first rod passageway 90 and to the slide direction 92 of the chamber. An extended side wall portion 94 of the plug is preferably perpendicular to the first rod passageway and occludes the passageway when the plug is in the closed position shown in the drawings. When a rod is being inserted, it pushes against the oblique face forcing the plug to slide against the flaps. The oversized head of the plug spreads the flaps as it slides along the chamber toward the far end 72. Once the plug clears the first hinge rod passageway and is in an unoccluding position, the rod can be received in the passageway. Once the rod is clear of the plug, the V-shaped spring pushes against the plug's head, urging the plug back toward the occluded position in which the plug's neck rests between the vertical ribs on the flaps. Thus, the spring automatically returns the retaining plug to its closed position.

Figure 7:
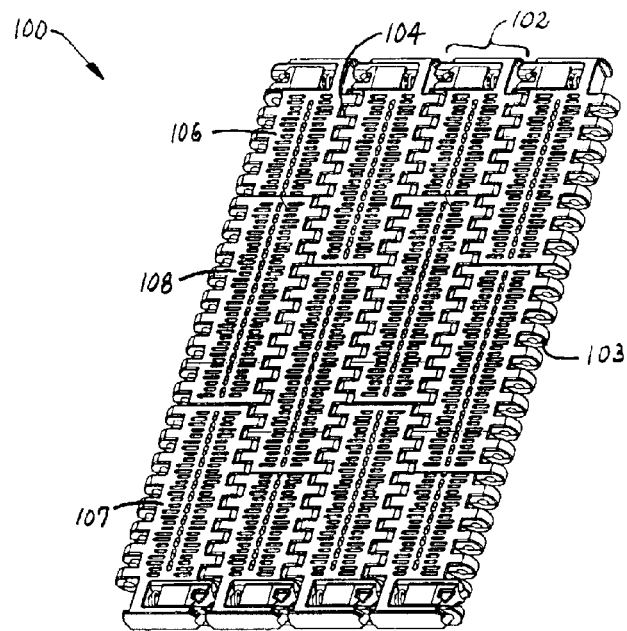
FIG. 7 is a pictorial representation of a portion of a modular plastic conveyor belt constructed with edge modules as in FIG. 1.

Either version of the edge module can be used to speed up and simplify the assembly or the repair of a modular plastic conveyor belt, a portion of which is shown in FIG. 7. Such a belt 100 is constructed of a series of rows 102 of plastic belt modules. The belt modules are preferably formed by injection molding out of thermoplastic materials, such as polypropylene, polyethylene, acetal, and composite resins. Hinge eyes 103 at each end of a row of modules are interleaved with the hinge eyes of an adjacent row. Hinge rods inserted in passageways formed through the hinge eyes interconnect adjacent rows in a hinge joint 104. In a typical bricklay pattern, each row consists of a short edge module 106 at one side edge, a long edge module 107 at the other side edge, and one or more internal modules 108 generally similar to, but without the belt side edge structure of, the edge modules. Consecutive rows typically have their short and long edge modules at opposite side edges to eliminate continuous seams between side-by-side modules from row to row. The self-closing plugs in the edge modules at the side edges of each row reliably retain the hinge rods in place in the belt.

Although the invention has been described in detail with respect to a few preferred versions, other versions are possible. For example, the plug was shown with the concave guide surfaces and the chamber flanked by cooperating convex guides. But the guide surfaces could be convex and the guides concave. The spring unitarily molded with the belt module could take forms other than the symmetrical V shape shown. For example, instead of two flaps, the spring could be made of a single flap extending from one side of the chamber with the other side of the chamber providing a guide for a mating guide surface on the rod retention plug. As other examples, other metal springs, such as metal clip springs and compression springs, to name a few, could be used. The spring could be molded into the retention plug as a plastic spring or could be an elastomeric spring. The chamber for the plug could open onto the outside edge of the belt or onto only one of the top and bottom sides of the module, instead of onto both the top and bottom sides as described in detail. So, as these few examples suggest, the scope of the invention should not be limited to the preferred versions described in detail.

What is claimed is:

1. An edge module for a modular plastic conveyor belt, the edge module comprising:
   a retention member defining a slide axis and including:
      a guide surface; and
      a rod-contacting face oblique to the slide axis;
   a module body extending longitudinally from a first end to a second end, laterally from an inside edge to an outside edge, and in thickness from a top side to a bottom side, the module body including:
      a first set of hinge eyes spaced apart along the first end and forming rod holes aligned laterally to define a first rod passageway;
      a second set of hinge eyes spaced apart along the second end and forming rod holes aligned laterally to define a second rod passageway;
      outside edge structure defining a chamber near the outside edge of the module body intersecting the first rod passageway and extending in a slide direction to a far end for receiving the retention member with the slide axis extending in the slide direction and with the rod-contacting face obliquely facing the outside edge of the module body, the outside edge structure including:
         a guide formed along the chamber and engaging the guide surface of the retention member to guide the retention member in the slide direction along the chamber in sliding contact between a first position in which the retention member at least partly occluding the first rod passageway and a second position in which the first rod passageway is unoccluded;
         biasing means residing in the chamber and urging the retention member toward the first position;
   wherein the end of a rod being inserted laterally from the outside edge of a belt including the edge module slidingly bears against the oblique rod-contacting face of the retention member, forcing the retention member to slide in the slide direction along the chamber against the biasing means to the second position until the retention member clears the first rod passageway and the rod slides off the rod-contacting face into the unoccluded first rod passageway.

2. An edge module as in claim 1 wherein the biasing means comprises a coil spring.

3. An edge module as in claim 1 wherein the biasing means is disposed in the chamber between the far end and the retention member.

4. An edge module as in claim 3 wherein the coil spring is a metal spring and wherein the outside edge structure of the module body includes a stub extending from the far end of the chamber and around which one end of the coil spring is encircled, the other end of the coil spring contacting the retention member.

5. An edge module as in claim 3 wherein the coil spring is a metal spring and wherein the retention member includes a stub at one end around which one end of the coil spring is encircled, the other end of the coil spring contacting the far end of the chamber.

6. An edge module as in claim 1 wherein the biasing means comprises a spring unitarily molded with the module body.

7. An edge module as in claim 1 wherein the biasing means comprises a spring unitarily molded with the retention member.

8. An edge module as in claim 6 wherein the spring comprises a flap extending obliquely into the chamber from a side wall of the chamber.

9. An edge module as in claim 6 wherein the spring comprises a pair of opposing flaps extending at first attached ends from opposite sides of the chamber proximate the first end of the module obliquely into the chamber toward the far end to second free ends forming a V-shaped structure open at its vertex, the flaps each including a rib extending in the thickness direction of the module body and positioned facing the corresponding rib on the other flap, and wherein the retention member includes a head and a neck at an end opposite the rod-contacting face and sides angling outward from the neck toward the rod-contacting face, wherein the head of the retention member is larger in diameter than the spacing between the ribs and resides between the pair of flaps between the ribs and the open vertex between the first position in which the ribs nestle in the neck and the second position in which the head of the retention member resides nearer the open vertex and pushes against the flaps to separate them further.

10. An edge module as in claim 1 wherein the rod-contacting face of the retention member defines a planar surface.

11. An edge module as in claim 1 wherein the guide in the outer edge structure defines a convex surface and wherein the guide surface of the retention member defines a concave surface that slidably receives the convex surface of the guide.

12. An edge module as in claim 1 wherein the guide in the outer edge structure comprises a ridge and the guide surface of the retention member defines a groove receiving the ridge.

13. An edge module as in claim 1 wherein the outer edge structure includes a pair of guides spaced apart laterally across the chamber and wherein the retention member includes a pair of guide surfaces defining sides of the retention member on opposite sides of the slide axis.

14. An edge module as in claim 1 wherein the guide in the outer edge structure of the module body extends from the first end of the module body to the far end of the chamber.

15. An edge module as in claim 1 wherein the retention member comprises first and second opposite sides bridged at one end by the rod-contacting face and wherein the first side is shorter than the second side in the direction of the slide axis.

16. An edge module as in claim 1 wherein the retention member further includes means for manually retracting the retention member from the first position to the second position.

17. An edge module as in claim 15 wherein the means for manually retracting comprises an indentation in the retention member accessible from the top or bottom side of the edge module.

18. An edge module as in claim 1 wherein the slide direction is perpendicular to the first rod passageway.

19. A modular plastic conveyor belt comprising a series of rows of plastic belt modules including edge modules as in claim 1 interconnected by hinge rods residing in the first and second rod passageways between consecutive rows.

20. An edge module for a modular plastic conveyor belt, the edge module comprising:
a module body extending longitudinally from a first end to a second end, laterally from an inside edge to an outside edge, and in thickness from a top side to a bottom side, the module body including:
a first set of hinge eyes spaced apart along the first end and forming rod holes aligned laterally to define a first rod passageway;
a second set of hinge eyes spaced apart along the second end and forming rod holes aligned laterally to define a second rod passageway;
outside edge structure forming a chamber near the outside edge of the module body intersecting the first rod passageway and extending to a closed far end;
a retention member slidably received in the chamber in the outside edge structure; and
a spring extending between the far end of the chamber and the retention member to urge the retention member toward the first end of the module body and into a position at least partly occluding the first rod passageway.

21. An edge module as in claim 19 wherein the spring is a metal coil spring.

22. An edge module as in claim 20 wherein an end of the metal coil spring is attached to a stub formed on an end of the retention member.

23. An edge module as in claim 19 wherein the outside edge structure of the module body further includes a stub extending from the far end of the chamber and to which one end of the spring is connected, the other end of the spring contacting the retention member.

24. An edge module for a modular plastic conveyor belt, the edge module comprising:
a module body extending longitudinally from a first end to a second end, laterally from an inside edge to an outside edge, and in thickness from a top side to a bottom side, the module body including:
a first set of hinge eyes spaced apart along the first end and forming rod holes aligned laterally to define a first rod passageway;
a second set of hinge eyes spaced apart along the second end and forming rod holes aligned laterally to define a second rod passageway;
outside edge structure defining a chamber near the outside edge of the module body intersecting the first rod passageway and extending in a slide direction to a far end;
a retention member slidably received in the chamber and including:
a rod-contacting face at the end of the retention member nearer the first end of the module body, wherein the rod-contacting face is oblique to the first rod passageway and to the slide direction.

25. An edge module as in claim 23 further comprising biasing means disposed in the chamber for urging the retention member toward the first end of the module body.

26. An edge module as in claim 23 wherein the retention member further includes a first side and an opposite second side bridged at one end by the rod-contacting face, wherein the first side is longer than the second side.

27. An edge module as in claim 23 wherein the retention member further includes opposite top and bottom sides generally trapezoidal in profile.

28. An edge module as in claim 23 wherein the rod-contacting face of the retention member is flat.

29. An edge module as in claim 23 wherein the retention member further includes a pair of opposite guide surfaces and the outside edge structure of the module body includes a pair of guides formed along opposite side walls of the chamber and that cooperate with the guide surfaces of the retention member in sliding contact.

30. An edge module as in claim 28 wherein the guide surfaces are concave and the guides are convex.

31. An edge module as in claim 23 wherein the slide direction is perpendicular to the first rod passageway.

32. An edge module as in claim 23 wherein the retention member further includes means for manually retracting the retention member from the first position to the second position.

33. An edge module as in claim 31 wherein the means for manually retracting comprises an indentation in the retention member accessible from the top or bottom side of the edge module.

34. An edge module for a modular plastic conveyor belt, the edge module comprising:
- a module body extending longitudinally from a first end to a second end, laterally from an inside edge to an outside edge, and in thickness from a top side to a bottom side, the module body including:
  - a first set of hinge eyes spaced apart along the first end and forming rod holes aligned laterally to define a first rod passageway;
  - a second set of hinge eyes spaced apart along the second end and forming rod holes aligned laterally to define a second rod passageway;
  - outside edge structure forming a chamber near the outside edge of the module body intersecting the first rod passageway and extending to a far end;
- a retention member received in the chamber in the outside edge structure and slidable between a closed position at least partly occluding the first rod passageway and an open position clear of the first rod passageway; and
- biasing means urging the retention member toward the closed position.

* * * * *